(12) United States Patent
Yen et al.

(10) Patent No.: US 8,270,815 B2
(45) Date of Patent: Sep. 18, 2012

(54) ONLINE VIDEO AND AUDIO EDITING

(75) Inventors: Ed Yen, Taipei (TW); Chia-Ho Hsieh, Taipei (TW)

(73) Assignee: A-Peer Holding Group LLC (TW)

( * ) Notice: Subject to any disclaimer, the term of this patent is extended or adjusted under 35 U.S.C. 154(b) by 451 days.

(21) Appl. No.: 12/564,311

(22) Filed: Sep. 22, 2009

(65) Prior Publication Data

US 2010/0080528 A1 Apr. 1, 2010

(30) Foreign Application Priority Data

Sep. 22, 2008 (CN) .......................... 2008 1 0149254
Dec. 23, 2008 (CN) .......................... 2008 1 0178099
Mar. 18, 2009 (CN) .......................... 2009 1 0128550

(51) Int. Cl.
*H04N 5/93* (2006.01)

(52) U.S. Cl. ...................................................... 386/278

(58) Field of Classification Search ........................ None
See application file for complete search history.

(56) References Cited

U.S. PATENT DOCUMENTS

| | | | |
|---|---|---|---|
| 5,724,605 A | 3/1998 | Wissner | |
| 2001/0036356 A1 | 11/2001 | Weaver et al. | |
| 2002/0097256 A1* | 7/2002 | Miller et al. | 345/723 |
| 2002/0175917 A1 | 11/2002 | Chakravarty et al. | |
| 2003/0146915 A1* | 8/2003 | Brook et al. | 345/473 |
| 2004/0001079 A1* | 1/2004 | Zhao et al. | 345/719 |
| 2004/0170382 A1 | 9/2004 | Portnykh | |
| 2007/0162855 A1 | 7/2007 | Hawk et al. | |
| 2010/0091113 A1* | 4/2010 | Morioka et al. | 348/207.1 |
| 2010/0153520 A1* | 6/2010 | Daun et al. | 709/218 |
| 2011/0026898 A1* | 2/2011 | Lussier et al. | 386/280 |

FOREIGN PATENT DOCUMENTS

| | | |
|---|---|---|
| EP | 1 394 800 A2 | 3/2004 |
| WO | WO 02/084598 A1 | 10/2002 |
| WO | WO 2007/082166 A2 | 7/2007 |

OTHER PUBLICATIONS

Apple Inc: "Help—Adobe After Effects CS3" [Online] Jan. 2008, XP002577901 URL: http://livedocs.adobe.com/en_US/AfterEffects/8.0/>.
Anonymous: "Adobe After Effects" [Online] Sep. 19, 2008, XP002577902 URL: http://en.wikipedia.org/w/index.php?title+Adobe_After_Effects&oldid=239493064>.
European Search Report, EP 09 25 2258, Apr. 15, 2010.

* cited by examiner

*Primary Examiner* — Thai Tran
*Assistant Examiner* — Sunghyoun Park
(74) *Attorney, Agent, or Firm* — Craig A. Fieschko, Esq.; DeWitt Ross & Stevens S.C.

(57) ABSTRACT

An online video and audio editing method and system can create edited final products by performing video and audio editing via a communication network. The system includes a server, which provides downloadable operator interface software; and a client terminal, which is connected with the server via a communication network. The client terminal downloads the operator interface software from the server to allow selection of target files, and generation of an editing result file by recording the editing information of each selected target file in a text format. The editing information is transmitted back to the server, and includes a priority order, a time to start playback, and a playback length of each selected target file. The server synthesizes all target files in accordance with the editing result file to create the edited final product.

13 Claims, 5 Drawing Sheets

Priority order = 4     D1

Priority order = 3     T1

Priority order = 2     E1    E2

Priority order = 1     A1   B1   C1

0 → T

Time Sequence of Playing Back Edited Final Product

Figure 5

ONLINE VIDEO AND AUDIO EDITING

CROSS-REFERENCE TO RELATED APPLICATIONS

This application claims priority under 35 USC §119(a) to Chinese (People's Republic of China) patent application CN 200910128550.0 filed 18 Mar. 2009; Chinese patent application CN 200810178099.9 filed 23 Dec. 2008; and Chinese patent application CN 200810149254.4 filed 22 Sep. 2008, the entireties of which are incorporated by reference herein.

FIELD OF THE INVENTION

This document concerns an invention relating generally to online video and audio editing, and in particular an online video and audio editing method and system that can provide online editing via a communication network (e.g., the Internet).

BACKGROUND OF THE INVENTION

As digital video and audio products grow in popularity, there are increasing demands for video and audio editing products. Existing commercial video editors can be used as specially-configured editing machines provided as independent equipment, or video editing software can be installed on multi-purpose equipment such as personal computers. When using either special or multi-purpose equipment, an operator is often faced with issues such as unfriendly operating environments, time-consuming operations, etc.

Traditionally, while performing editing such as film cutting, an operator must find the desired portions to be edited by rapidly playing back the film/video. As a result, the operator must closely look at the monitor while searching so as to find the portion to be edited. While editing, the operator must usually repeatedly perform similar operations to reach desired results. Consequently, traditional editing technologies are very time-consuming and inefficient, and tend to cause eyestrain for the operator. Operators who are not trained professionals particularly find it difficult to perform image editing due to inconvenient operation and other factors.

In addition to the foregoing "pure" editing operations, further difficulties arise with synthesis editing (i.e., combination or "mash-up") of raw materials such as dynamic images, static images, and audio (e.g., music), and more complex editing operations such as adding special effects, text, etc.

Moreover, as networks get more popular, operators can acquire various video and audio files from the Internet or local area nets. In other words, if an operator intends to perform image editing, he can acquire desired image files via a network. However, since image files usually have large sizes, they demand relatively more bandwidth for network transmission. As a result, it takes a long time for operators to merely perform the download operation while acquiring video from a network. In addition, memory and other hardware resources that are allocated to a network browser are usually very limited. Therefore, operators tend to be unable to acquire images to be edited from a network, and to perform online editing, in real time.

Therefore, online video and audio editing methods, devices and systems are needed to provide more user-friendly operations and to make it possible to preview and perform editing operations, such as cutting, synthesis (combination), special effects addition, etc., in real time on desired material acquired from a network, and/or from databases contained on the computers/editing devices and related equipment.

SUMMARY OF THE INVENTION

The present invention is intended to at least partially provide methods, systems, and devices for online video and audio editing that allows operators to perform editing operations such as cutting, synthesis editing (combination or "mash-up" of different files/media), special effect addition, etc. in real time via a communication network.

The invention includes a method for online video and audio editing which can perform video and audio editing via a communication network to create an edited final product, wherein the method includes at least the following steps:

(1) Select target files for editing. Exemplary target files that can be used for editing include dynamic image files (e.g., video), static images (e.g., photos), audio content, text special effects (e.g., text addition/overlay), video and audio special effect operations (e.g., blurring, fading, distortion, etc.), and recording operations.

(2) For each selected target file, define a segment start time within the target file to start playback of the target file within a final product, and also define a segment playback length of the target file within the final product. The segment start time and segment playback length define a target file segment (i.e., a desired portion of the selected target file to be used in the final product). Also, a priority order of the target file segment within the final product is defined. Dynamic images and static images preferably have the highest priority order, video and audio special effects preferably have the second highest priority order, text special effects preferably have the third highest priority order, audio contents preferably have the fourth highest priority order, and recording operations preferably have the lowest priority order. A playback start time of the target file segment within the final product is also preferably defined, i.e., a time within the final product at which playback of the target file segment is begun.

(3) The foregoing editing information for each selected target file—the segment start time, segment playback length, priority order, and also preferably the playback start time—are recorded in an editing result file. The editing result file is preferably in a text format, most preferably XML format.

(4) A final product is generated in accordance with the editing result file, wherein the final product is formed of the combined target file segments assembled as per the editing information. Initially, all target file segments with the same highest priority order are first used to create a preliminary final product according to their playback start times. For example, all selected video/photo target file segments, which have a priority of 1, are connected in order of lowest to highest playback start times to create a preliminary final product. Then, selected target file segments having the second highest priority order are added to the preliminary final product according to their playback start times. This process is then repeated with the selected target file segments having the third highest priority order, the fourth highest priority order, and so forth. The final product is thus generated.

The invention also includes a system for online video and audio editing which can perform video and audio editing via a communication network to create an edited final product. The system includes a server which provides a downloadable operator interface (as in the form of downloadable software), and a client terminal which is connected in communication with the server via the communication network. The client terminal downloads the operator interface from the server to execute the method described above. The client terminal can take the form of a personal computer, laptop computer, digital assistant, mobile phone, or digital assistant.

The invention also includes a device for online video and audio editing including a computing device and a monitor, wherein the computing device is configured to display an operator interface on the monitor such as the one discussed above. The operator interface then allows performance of the method described above.

The operator interface software generates an operator interface including a target file selection area and a playback area. When target files are moved from the selection area to the playback area, the moved target files are selected as the ones for editing. Further, when a target file is placed in the playback area, the target file's playback start time is defined. When any selected target file is a static image, it behaves as a dynamic image by setting the playback time of the static image as a predetermined duration.

The invention allows a client terminal's browser with limited resources to quickly and easily perform editing on video, audio, images, and other contents, and provide a user-friendly editing interface with intuitive operation. Operators can easily and quickly locate needed portions of target files and perform editing.

DETAILED DESCRIPTION OF EXEMPLARY VERSIONS OF THE INVENTION

In the following detailed description, numerous specific details are discussed so as to help the reader understand the invention. It should be understood, however, that the invention is not limited to the described versions. Various replacements, modifications, and equivalents may be made without departing from the spirit and scope of the invention defined in the claims.

The invention generally relates to video and audio synthesis editing (i.e., assembly of video and audio from various sources), and can be realized in different forms, such as in procedures/methods or in devices/systems. Video and audio synthesis editing according to the invention will now be explained with reference to the accompanying drawings.

Figure 1:
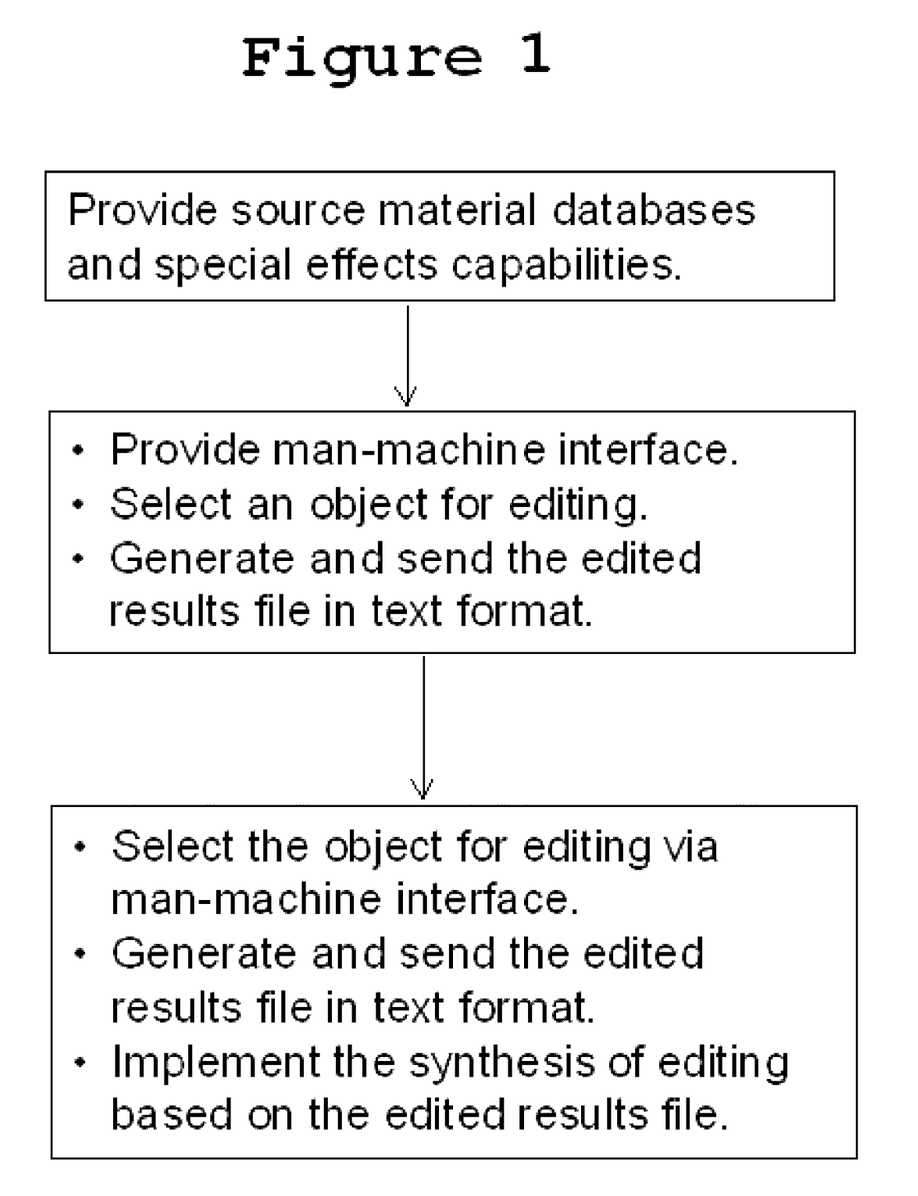
FIG. 1 is a flow chart illustrating online video and audio editing as per an exemplary version of the present invention.

FIG. 1 is a block diagram showing a video and audio synthesis editing operation 100 according to the present invention. The video and audio synthesis editing operation 100 includes a raw material database, special effect functions, an operation interface, and a synthesis editing operation.

Target File (Raw Material) Database and Special Effect Functions:

A target file (raw material) database and special effect functions are provided. Special effect functions include video or audio effects to be applied to files being edited. Numerous video or audio effects are provided as editing targets to be selected while editing. These special effect functions include image blurring, image distortion, color changes, audio amplification, and sound distortion, among others.

A target file database is also provided, which stores original target files and working target files for the video and audio synthesis (combination) editing. Original target files include digital content such as audio, video, and static images, while working target files include the digital content resulting after pretreatment on the original target files. The content in working target files is largely unchanged from that in the original target files, but (for example) resolution may be reduced, allowing easier use of working target files for editing. To make editing easier and faster, the working target files obtained after pretreatment on the original target files are used for editing. After the editing is completed, corresponding original target files are retrieved from the database for playback when the edited content is to be played.

As described above, target files include, for example, dynamic videos such as video, audio content, and static images such as pictures and slides, wherein videos and audio content are series flows while static images are non-series flows. So-called "series flow" means that the content being played changes along with the playback time.

In preferred versions of the invention, images are used to represent working target files (i.e., different contents of target files are represented by unique images in the operator interface display window described below). The image resolution is processed (e.g., reduced) to be compatible with the operation of an editing operation window as described below. After pretreatment, in the case of static image target files, the static images themselves are used as the images representing target files. In the case of a dynamic image target file, a pre-selected specific image from the dynamic image target file is used as the representative image. The resolution of the selected image will be reduced to decrease software and hardware resources consumed by the image, such as memory or transmission bandwidth. Of course, resolutions of static images and audio target files can also be reduced.

In summary, the pretreatment on working target files reduces the resolution of original target files to generate working target files, and uses images to represent the target files for display in the editing window. In addition, other information regarding these target files, such as (for example) file name, author, and brief introduction, are simultaneously displayed as text on the representative images.

Operator Interface

A user-friendly operator interface is provided to allow operators to perform online editing in real time. The operator interface allows operators without special training to perform complex editing operations. It should be noted that these complex editing operations may be performed on browsers with limited resources.

The program to generate the operator interface can be downloaded from a server via a communication network, such as the Internet, to a client terminal, e.g., an operator's personal computer or mobile device.

Figure 2:
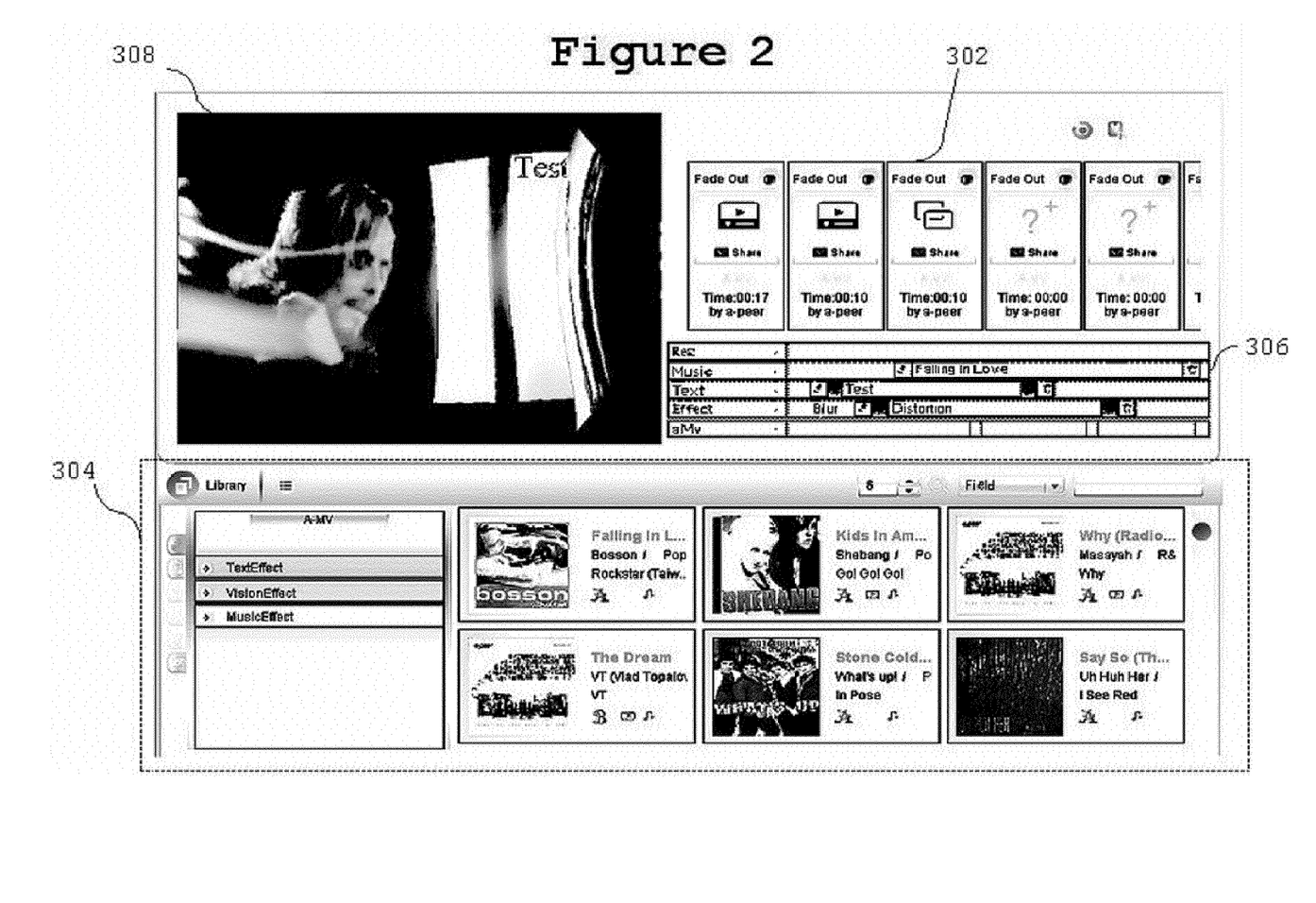
FIG. 2 illustrates an exemplary operator interface.

FIG. 2 shows an exemplary operator interface, primarily including edited target file area 302, target file selection area 304, time axis area 306, and playback area 308.

In the edited target file area 302, different images are used to display an edited target file, a target file with editing in progress, and a blank file. Empty spaces represent target files that have not been edited. Upon appropriate input such as pressing a spacebar, a new editing file is generated.

Target file selection area 304 displays target files for selection. For example, target files may include video and audio files, video and audio special effect functions, text special effect functions, and recording functions, among others. These target files used for editing will be displayed as text or images in selection area 304 for selection by the operator. For example, the foregoing video and audio contents can be displayed in the working target file display window to the right of selection area 304 (to be explained later) by the images of their corresponding working target files. In this way, operators can use a pointing device such as a mouse to select partial or full contents of target files and drag the same to the playback area 308 for editing. Playback area 308 is used to play back in real time the partial or full contents dragged from target file selection area 304. Playback area 308 can be a flash video player.

In time axis area 306, there may be a plurality of time axes such as main time axis (a-Mv), audio time axis (Music), text time axis (Text), special effect time axis (Effect), and recording time axis (Rec), among others. The time axis 306 allows operators to easily perform editing and synthesis/combination operations on a variety of target files and special effects.

In selection area 304, images of working target files are displayed in the working target file display window at right. The working target file display window has a specific resolution to display target file images, and the length of its horizontal axis represents the total collective time length of the target files displayed therein. As a result, the horizontal axis can be seen as the time axis of target file playback. When a pointing device such as mouse moves to the working target file display window of selection area 304, an indicator such as a straight line may be displayed therein (as discussed later in relation to FIGS. 3A-3B). Segments of target files may be selected for use by operating the mouse to control the straight line, and the time periods of the selected segments relative to the overall target files may be displayed in shade or shadow. When a target file is audio content or a static image, which is usually only represented by a single image, the image will not change no matter where on the horizontal axis the straight line moves to. When a target file is a dynamic image including numerous image frames (such as a video), the image displayed on the working target file display window will change along with the movement of the straight control line on the horizontal axis representing the playback time thereof so that the operator can perform the selection operation. The selected segment of the target file will be displayed in shade or shadow, while the width of the shade on the horizontal axis represents the time length of the selected segment.

Figure 3A:
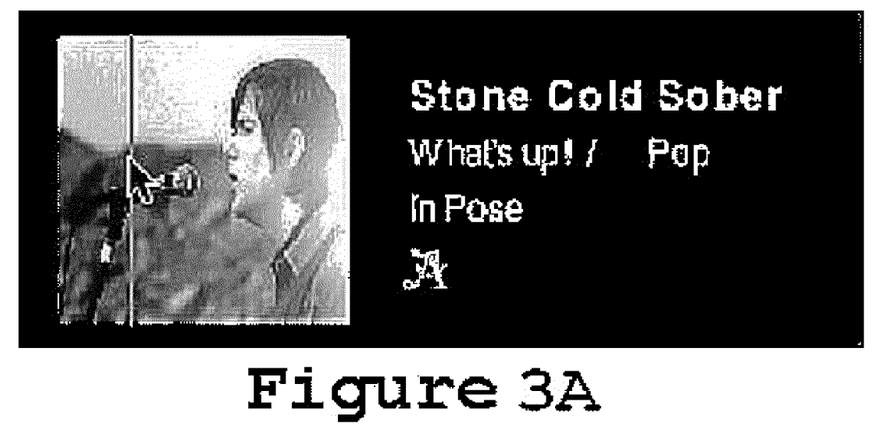
FIG. 3A and FIG. 3B illustrate an example of the definition of a target file segment from a target file.
Figure 3B:
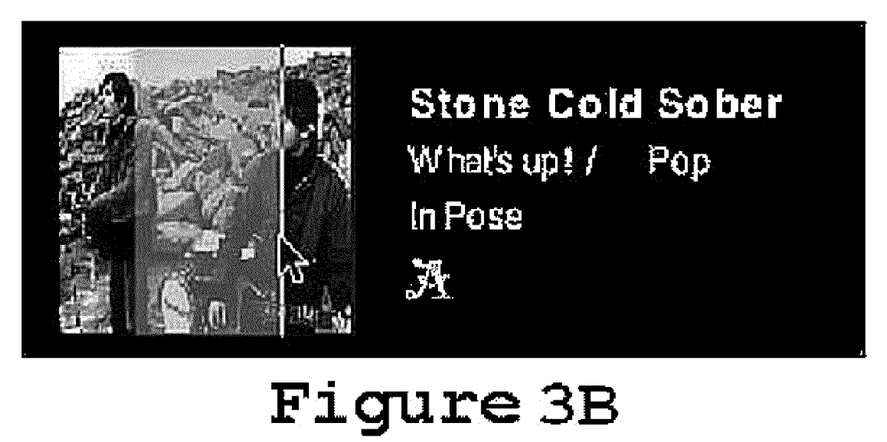

The selected (shaded) segment of a target file will be further explained with reference to FIG. 3A and FIG. 3B. As shown in FIG. 3A and FIG. 3B, in the case where a dynamic video is displayed in the working target file display window to the right of selection area 304, when an operator moves the straight line in the working target file display window to any position of the window using a pointing device such as mouse, the corresponding image frame can be displayed in the window in real time. At this time, the straight line's position also represents the time of the image frame with respect to the overall target file. When a segment is selected with a mouse, the selected segment may be displayed in shade, and the ratio of the shade's width to the horizontal axis length of the working target file display window equals the ratio of the segment's playback length to the overall playback length of the target file. Similarly, in the case where a target file is a audio content or a static image, the selected segment may also be displayed in shade, and the ratio of the shade's width to the horizontal axis length of the working target file display window equals to the ratio of the segment's playback length to the overall playback length of the target file.

It should be noted that when a segment of a target file displayed in the working target file display window is selected, the coordinates of the control line pointer in the working target file display window will be recorded dynamically in real time. Therefore, when the selected segment is confirmed, the coordinates of the starting point and ending point of the segment will be recorded. In this coordinate recording program, coordinates are preferably recorded in real time in a manner that requires minimal storage space, such as a text file in XML format.

Synthesis (Combination) Editing Operation:

A version of a synthesis editing operation, i.e., a file/media combination operation, in accordance with the present invention will now be described with further reference to FIG. 2.

When an operator is to generate a new editing file, he can choose the icon in the edited target file area 302 that represents a blank file. At this time, three production formats including video, slide, and album, will be generated on the operator interface for the operator to select. When the operator picks the format to be produced, he or she can then enter the editing operation. The video production format will now be described as an example.

In this version, a segment selected from video A, a segment from video B, and digital picture C are synthesized (combined) in order to create a video. A segment of audio/music D is used as background music, and text T1 and synthesized special effects E1 and E2 are also added.

First, a segment of video (target file) A to be edited is selected from selection area 304 using a computer mouse, and the resulting Segment A1 is then dragged to playback area 308. At this time, the selected segment will be immediately played back in playback area 308. Meanwhile, the color of main time axis a-Mv in time axis area 306, representing the time length of the final product to be completed, changes to a different color (e.g., from blank to black), or is shown in color shade. At this time, the whole length of main time axis a-Mv represents the time length of selected Segment A1. If the starting time and ending time of Segment A1 in target file A are Vts and Vte, respectively, and the time length is P1=Vte−Vts, then the whole length of main time axis a-Mv now represents P1's time length.

When Segment A1 is dragged from the target file data area to playback area 308, the index information that represents video/target file A and the starting time, ending time, and priority order of Segment A1 will be generated from the working target file display window to the right of selection area 304 in a text file (e.g., in XML format). The synthesis editing operation will retrieve contents corresponding to this text file to play back the same in playback area 308, which is also used to control the display in the time axis area. The synthesis editing operation also generates an editing result file with the information of this text file, Segment A1's playback start time, and other information and stores the same in a text file. "Playback start time" refers to the "play head position" on the a-Mv time axis when Segment A1 is placed in the playback area 308 from the data area, which represents the time to start the playback of Segment A1 in the edited final product. The "play head" herein refers to a virtual play head, which is equivalent to a play head in a regular actual sound player, while the play head position in the product means that this position's content is being played.

The priority order may define the priority level of the item to be processed. In this case, the priority order refers to the priority level of the target file to be processed. As an example, in preferred versions of the invention, the priority order of video is assigned as 1, special effect as 2, text as 3, background music as 4, and recording as 5.

Similarly, a segment of video B with a length of P2 (hereinafter referred to as Segment B1) is then dragged to playback area 308. At this time, the length of main time axis a-MV will represent a total time of P1+P2−O1, wherein O1 is the overlapping part of the two segments. At this time, main time axis a-MV consists of a first segment representing the first period P1 of time and a second segment representing the second P2 period of time, and these two segments have the same color. A small block of a different color is placed between the two periods of time to separate the segments, with the small block representing the overlapping part (O1) of the two segments. Alternatively or additionally, the two segments may have different colors.

At this time, the editing operation may retrieve contents corresponding to the text file to display the same in playback area 308, which is also used to control the display in the time axis area 306. The editing synthesis operation updates the editing result file previously generated with the information associated with Segment A1. The editing result file is updated by adding the information of this text file, Segment B1's playback start time, and other information into the editing result file. The play head position on the a-Mv time axis when Segment B1 is placed in the playback area represents the time to start the playback of Segment B1 in the edited final product.

Similarly, when digital picture C (with playback time being predefined as P3) is dragged to playback area 308, the entire length of the main time axis represents a total time of P1+P2+P3−O1−O2, wherein O2 is the overlapping part of Segment B1 and C. At this time, main time axis a-MV consists of a first segment representing the first period P1 of time, a second segment representing the second period P2 of time, and a third segment representing the third period P3 of time, while overlapping parts O1 and O2 between each period are represented by a small block of a different color. The digital picture C that is continuously displayed for a period of time P3 is hereinafter referred to as Segment C1.

Similarly, at this time, the display control operation also retrieves contents corresponding to the text file from the selection operation to play back the same in playback area 308, which is also used to control the display in the time axis area 306. The editing operation generates an updated editing result file including the information regarding Segment C1. Similarly, the play head position on the a-Mv time axis when Segment C is placed in the playback area represents the time to start the playback of Segment C1 in the edited final product. In addition, the priority order of Segment C1 is also assigned as 1.

Therefore, when a plurality of target file segments to be edited are added in some order to playback area 308, changes to the entire playback time length are represented by the addition of new segments despite the fact that the actual length of the main time axis remains unchanged. Visually, the ratio of each segment's length to the whole length of the main time axis is directly proportional to the ratio of the playback length represented by each segment to the overall playback length.

As described above, the working target file display window to the right of selection area 304 may record the information of target file segments selected by operators in real time, and when the selected segments are dragged to the playback area, it may also transmit the information to the editing operation, based on which playback contents are retrieved and played. Moreover, in the time axis area 306, the time axis display is correspondingly changed. In addition, the information is updated in an editing result file provided in a text format. Alternatively or additionally, other functions such as video, audio, and text special effects can also be displayed in an image or text format in the display area for selection, and can be dragged to the playback area to complete the selection operation.

In the foregoing example, three target files are added into the synthesis editing. However, the present invention is not limited to three, and may include any number of segments greater than one. Furthermore, video or static image segments may be used as target files for the synthesis editing in the description above. However, the invention is not limited to these, and may also include, for example, audio target files.

Next, when audio/music content with a time length of P4 is to be added as background music between a time T1 in Segment A1 and a time T2 of Segment C, the music start time in Segment A1 can be quickly located by rapidly moving the play head (not shown) on main time axis aMV. Then, selected segment D1 of music D may be dragged to playback area 308 to complete the addition of background music. At this time, a color-shaded segment will be generated on the music time axis to represent the period of time P4. The starting point of time period P4 on the music time axis is shown as corresponding to time T1 on main time axis a-Mv, while its ending point is shown as corresponding to time T2 in Segment C on main time axis a-Mv. The total length L1 of period of time P4 has a corresponding proportional relation with the total length Lm of main time axis a-Mv. For example, for the three segments P1+P2+P3−O1−O2 in the example above, when the main time length is Lm, the length of color shade L1 that represents P4 on the music axis is defined as follows:

$$L1 = Lm \times (P4)/(P1+P2+P3-O1O2)$$

Therefore, it is easy to determine the timing/position of background music in the required product according to the relative positions of the color shade on the music time axis with respect to each color shade on the main time axis. When the position or playback length of background music needs to be changed, the resulting change can be watched or heard in real time in playback area 308 by moving the play head on the music time axis or adjusting the horizontal width of color shade. At this time, since the music starts from a point in Segment A1 and ends at a point in Segment C1, the overall time of the edited final product under assembly is not changed, which is still P1+P2+P3−O1−O2.

Similarly, the working target file display window to the right of selection area 304 transmits the information related to segment D1 to the synthesis editing operation in a text file. In a manner similar to foregoing discussions, the synthesis editing operation generates an updated editing result file, incorporating the information associated with segment D1. At this time, the play head's time position on the music time axis when content D1 is placed in the playback area represents the timing/position to start the playback of content D1 in the edited final product being constructed. Moreover, the priority order (defining its processing priority level) of the music content is assigned as 4.

Similarly, specific text string T with a time length of P4, such as "Happy Birthday," may be added to the edited final product under construction. When this is done, a color-shaded segment will be generated on the text time axis correspondingly. The playback start time and the length of the text string can be easily changed by operating on this color-shaded segment. At this time, the total time of the edited product is still P1+P2+P3. Similarly to operations discussed above, the synthesis editing operation generates an updated editing result file including information associated with the text string T. The text herein may be placed between Segments B1 and C1. The priority order (or processing priority level) of the text content is assigned as 3.

Similarly, when a special effect such as blurring or distortion is added to the respective video segments A1 and B1 of the final product under construction by selecting special effect functions, color-shaded segments will be generated on the effect time axis correspondingly. The duration of special effect E1 herein is P5 and that of special effect E2 is P6. Similarly, the playback start time and the length of an effect can be easily changed by operating on its color-shaded segment. At this time, the total time of required edited product is still P1+P2+P3−O1−O2. Similarly to operations discussed above, the synthesis editing operation also updates the previous editing result file in addition to receiving the information transmitted by the selection operation to display editing results and change the display in the time axis area 306. The priority order of special effects E1 and E2 is assigned as 2.

When an operator completes the editing on the operator interface, an editing result file in text format is uploaded to an editing operation terminal, such as a network server, to perform editing to compile the edited final product. For example, the text file according to the above edited product can be expressed as follows.

```
Start
   Video index = 005 (video A)
      Tstart = 04:02 (mm/sec)
      Tend = 05:10 (mm/sec)
      Playhead = 0 hr:0 min:0 sec
      Priority = 1
   Video index = 001 (video B)
      Tstart = 24:02 (mm/sec)
      Tend = 25:30 (mm/sec)
      Playhead = 0 hr:1 min:06 sec
      Priority = 1
   Picture index = 101 (picture C)
      Tstart = 00 (sec)
      Tend = 05 (sec)
      Playhead = 0 hr:2 min:33 sec
      Priority = 1
   Music index = M008 (background music D)
      Tstart = 01:20 (mm/sec)
      Tend = 02:57 (sec)
      Playhead = 0 hr:1 min:00 sec
      Priority = 4
   Effect Function = E1 (special effect E1)
      Tduration = 00:10 (mm/sec)
      Playhead = 0 hr:00 min:25 sec
      Priority = 2
   Effect Function = E2 (special effect E2)
      Tduration = 00:05 (mm/sec)
      Playhead = 0 hr:01 min:25 sec
      Priority = 2
   Text = "Happy Birthday" (text T1)
      Tduration = 00:10 (mm/sec)
      Playhead = 0 hr:02 min:30 sec
      Priority = 3
End
```

Figure 4:
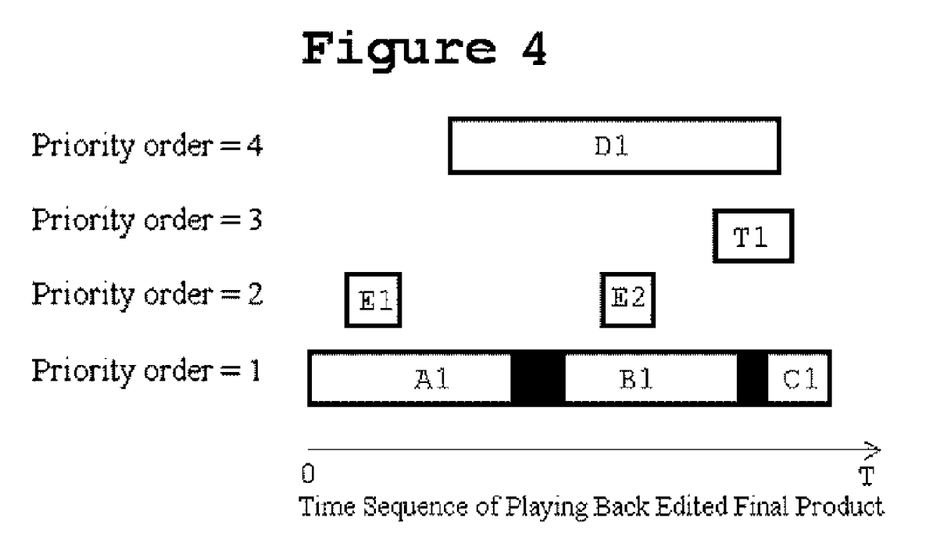
FIG. 4 is a schematic drawing illustrating an example of the generation of a final product from several target file segments.

The editing operation of the editing result file is described next with reference to FIG. 4. FIG. 4 is a schematic diagram showing the editing of each target file segment relative to the playback time sequence. In order to be concise, however, it is not plotted to scale.

The editing operation compiles segments of the target files according to the received editing result file. During the operation, selected video segments A1, B1 and C1, which have the highest priority order (e.g. 1), are retrieved from the database first. These are then collected in the prescribed order, according to the playback start time of each segment. As shown in FIG. 4, as the playback start time of Segment A1 is earlier than those of Segments B1 and C1 and that of Segment B1 is earlier than that of Segment C1, the segments B1 and C1 will be placed after A1, and Segment C1 is placed after Segment B1. It should be noted that when the editing operation learns that there are overlapping parts of the segments according to the playback length (=Tstart−Tend) and the playback start time of each segment, it may use predetermined overlapping operation functions (such as fade-in and/or fade-out) to process the overlapping parts. In FIG. 4, black blocks are used to represent overlapping parts of the segments, and the time axis below represents the playback time sequence.

Next, special effects E1 and E2 with the second highest priority order (i.e., 2) are added to the already compiled segments A1+B1+C1. When adding the special effects, according to each special effect's playback start time (play head position) and duration, the special effect operation is performed on the collected segments from the time corresponding to the effects' playback start time and playback length (duration). For example, blurring special effect E1's playback start time is the 25th second and its duration is 10 seconds. As a result, the editing operation will perform the blurring special effect E1 on the collected segments A1+B1+C1 starting from the 25th second to the 35th second to blur the segment A1. Then, it will perform the operation of distortion special effect E2 on the segment B2 starting from 1 min: 25 sec to 1 min: 30 sec of the collected segments A1+B1+C1 to distort the segment B1.

The editing operation then performs the text effect operation with the third highest priority order (i.e., 3). In this version, for example, text T1 "Happy Birthday" may be added to the segment from 2 min: 30 sec to 2 min: 40 sec of A1+B1+C1 to make the collected segments display the text "Happy Birthday" one or more times.

The editing operation then performs the audio operation, which has priority order 4. Background music D1 with duration of 1 min 37 sec is added to the collected segments A1+B1+C1 from 1 min: 00 sec to 2 min: 37 sec to make the compiled segments play background music D1.

Based on the editing result file, the editing operation completes the edited final product. If the editing operation terminal is a website server, it may transmit a URL from which the edited final product can be downloaded by operators via a network such as the Internet. The operators may then download the previously edited final product from the website.

An operator can then distribute a file containing the edited final product. For example, an operator may forward the edited final product as a birthday card. Additionally or alternatively, the website server can access the edited final product and provide it to other operators. Thus, the website server might forward the edited final product as a birthday card on the operator's behalf. It should be noted that during the distribution of the edited final product, the editing result file is transmitted in text format which requires minimal network resources. As a result, operators can easily and instantly download the edited final product from the specified website via a network.

The invention includes a selection operation and a control operation. The selection operation records the index/order of selected target files, and the beginning time and ending time of the selected segments (via the segment start time and segment playback length), in a text format and transmits the same to the control operation. The control operation edits the information transmitted from the selection part and other information, such as the current time of the play head (playback starting position), into an editing result file in a text format. The editing result file can be transmitted among different operations for retrieving, returning, and displaying target files such as video, and for performing the editing such as splitting, cutting and/or joining. The editing result file can be easily distributed to other operators. By recording and transmitting coordinates that represent video contents in a text file of the smallest size, the invention avoids issues arising out of transmitting the image files and/or performing editing directly on the image files, which is time-consuming and requires abundant computer resources.

Figure 5:
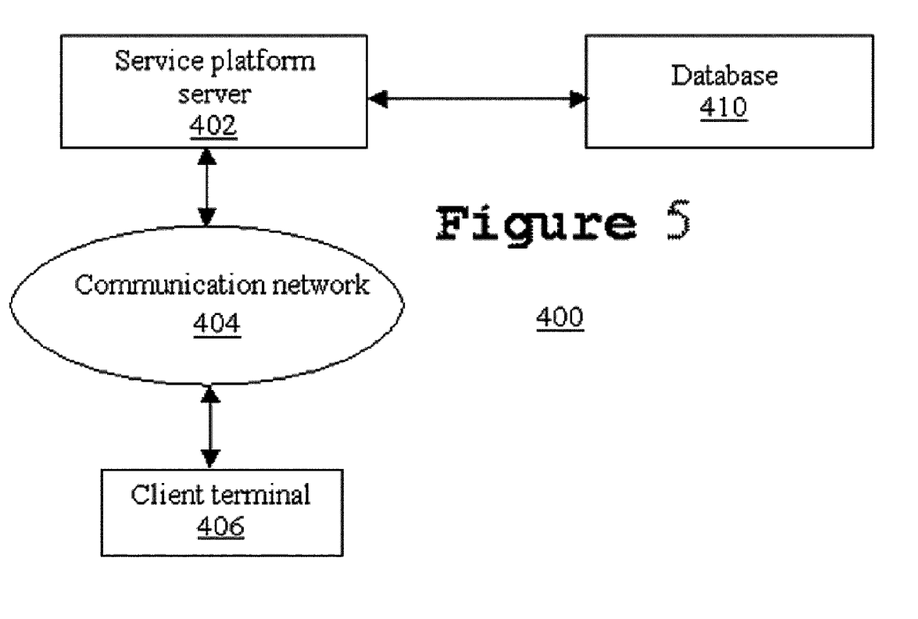
FIG. 5 illustrates an exemplary online editing system in accordance with the invention.

FIG. 5 illustrates an exemplary online editing system 400. As shown in FIG. 5, online editing system 400 includes service platform server 402, communication network 404, and client terminal 406. Service platform server 402 is configured with target file database 410 including audio, video, image, or other target files, and is connected with client terminal 406 via a communication network such as the Internet. Users/operators of client terminal 406 download the editing operator program/operator interface from server 402 via a communication network so as to perform the above-described editing operation. For example, the client terminal can be a desktop computer, a laptop computer, a mobile phone, and/or a personal digital assistant.

When an operator completes the editing, the data related to the edited contents can be stored in a text file and transmitted to service platform server 402 via a communication network. Upon request by a client terminal 406, service platform server 402 may transmit the text file that can download the edited contents to client terminal 406 or other operators via communication network 404.

Even a client terminal browser having limited resources can quickly and easily perform editing on video, audio, images, and other contents, while providing a user-friendly interface with intuitive operation. Operators can easily and quickly locate segments of data and perform editing.

The foregoing editing operation can be performed by devices including a computing apparatus and monitors, such as (for example) a desktop computer, laptop computer, mobile phone, and/or personal digital assistant.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A method for online video and audio editing:
   a. the method including the following steps:
      (1) selecting target files for editing;
      (2) for each selected target file, defining editing information including:
         (a) a target file segment defined by:
            (i) a segment start time within the target file to start playback of the target file within a final product,
            (ii) a segment playback length of the target file within the final product,
         (b) a playback start time within the final product to start playback of the target file segment,
         (c) a priority order of the target file segment within the final product,
      (3) generating an editing result file in a text format, the editing result file including the editing information of each selected target file;
      (4) generating a final product in accordance with the editing result file, the final product being populated with the target file segments in accordance with:
         (a) each target file segment's priority order, and
         (b) each target file segment's playback start time;
   b. wherein:
      (1) each target file is selected from a group consisting of:
         (a) dynamic image files,
         (b) static image files,
         (c) video special effects,
         (d) audio special effects,
         (e) text special effects, and
         (f) audio files;
      (2) target file segments defined from dynamic image files and static image files have the first highest priority order,
      (3) target file segments defined from video special effects and audio special effects have the second highest priority order,
      (4) target file segments defined from text special effects have the third highest priority order, and
      (5) target file segments defined from audio files have the fourth highest priority order.

2. The method of claim 1 wherein the editing result file is in XML format.

3. The method of claim 1 wherein:
   a. the step of selecting target files includes moving a target file from a target file selection area to a playback area in an operator interface, and
   b. upon moving the target file, the playback start time for the moved target file is defined.

4. A system for online video and audio editing including:
   I. a server providing a downloadable operator interface, and
   II. a client terminal connected with the server via a communication network,
   wherein:
   a. the client terminal is configured to:
      (1) download the operator interface from the server;
      (2) within the operator interface:
         (a) select target files for editing;
         (b) for each selected target file, define editing information including:
            (i) a target file segment defined by:
               1) a segment start time within the target file to start playback of the target file within a final product,
               2) a segment playback length of the target file within the final product,
            (ii) a playback start time within the final product to start playback of the target file segment,
            (iii) a priority order of the target file segment within the final product,
         (c) transmit to the server an editing result file, the editing result file:
            (i) being in a text format, and
            (ii) including the editing information of each selected target file,
   b. the server is configured to, upon receiving the transmitted editing result file, collect the target file segments in order of:
      (1) firstly each target file segment's priority order, and
      (2) secondly each target file segment's playback start time,
      with the collected target file segments defining a final product;
   c. each target file is selected from a group consisting of:
      (1) dynamic image files,
      (2) static image files,
      (3) video special effects,
      (4) audio special effects,
      (5) text special effects, and
      (6) audio files;
   d. target file segments defined from dynamic image files and static image files have the first highest priority order;

e. target file segments defined from video special effects and audio special effects have the second highest priority order;
f. target file segments defined from text special effects have the third highest priority order; and
g. target file segments defined from audio files have the fourth highest priority order.

5. The system of claim 4 wherein when any selected target file is a static image, its target file segment is defined by display of the static image for an operator-defined segment playback length.

6. The system of claim 4 wherein the client terminal is selected from a group consisting of:
   a. personal computers,
   b. laptop computers,
   c. personal digital assistants, and
   d. mobile telephones.

7. The system of claim 4 wherein the editing result file is in XML format.

8. The system of claim 4 wherein the operator interface includes:
   a. a target file selection area wherein the target files are displayed, and
   b. a playback area,
   wherein the target files are selected for editing by moving each of the selected target files from the target file selection area to the playback area, with the playback start time for each selected target file being defined upon moving each of the selected target files from the target file selection area to the playback area.

9. A device for video and audio editing including:
I. a computing device, and
II. a monitor,
wherein the computing device is configured to display an operator interface on the monitor, the operator interface allowing:
   a. selection of target files for editing,
   b. definition of editing information for each selected target file, the editing information including:
      (1) a target file segment defined by:
         (a) a segment start time within the target file to start playback of the target file within a final product,
         (b) a segment playback length of the target file within the final product,
      (2) a playback start time within the final product to start playback of the target file segment,
      (3) a priority order of the target file segment within the final product,
   c. recording of an editing result file including the editing information of each selected target file, the editing result file being in a text format, and
   d. collect the target file segments in order of:
      (1) firstly each target file segment's priority order, and
      (2) secondly each target file segment's playback start time,
      with the collected target file segments defining a final product;
wherein:
   (i) target file segments defined from dynamic image files and static image files have the first highest priority order,
   (ii) target file segments defined from video special effects and audio special effects have the second highest priority order,
   (iii) target file segments defined from text special effects have the third highest priority order, and
   (iv) target file segments defined from audio files have the fourth highest priority order.

10. The device of claim 9 wherein each target file is selected from a group consisting of:
   a. dynamic image files,
   b. static image files,
   c. video special effects,
   d. audio special effects,
   e. text special effects, and
   f. audio files.

11. The device of claim 10 wherein when any selected target file is a static image, its target file segment is defined by display of the static image for an operator-defined segment playback length.

12. The device of claim 9 wherein the operator interface includes:
   a. a target file selection area wherein the target files are displayed, and
   b. a playback area,
   wherein the target files are selected for editing by moving each of the selected target files from the target file selection area to the playback area, with the playback start time for each selected target file being defined upon moving each of the selected target files from the target file selection area to the playback area.

13. The device of claim 9 wherein the editing result file is in XML format.

* * * * *